_United States Patent Office_

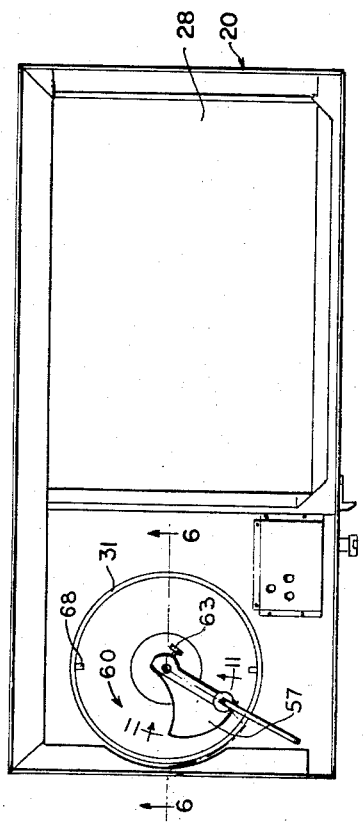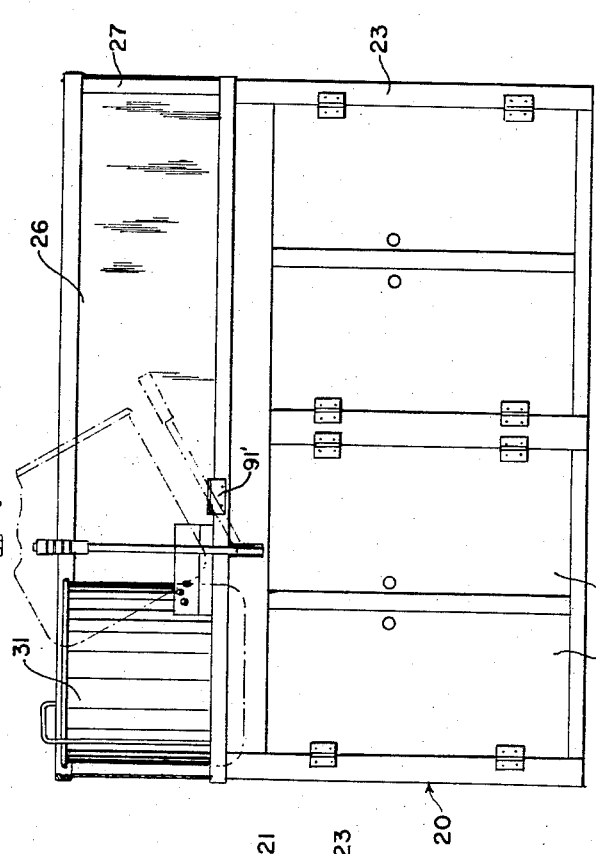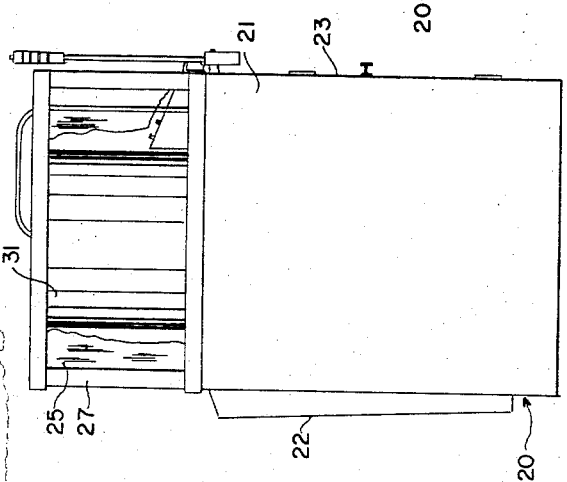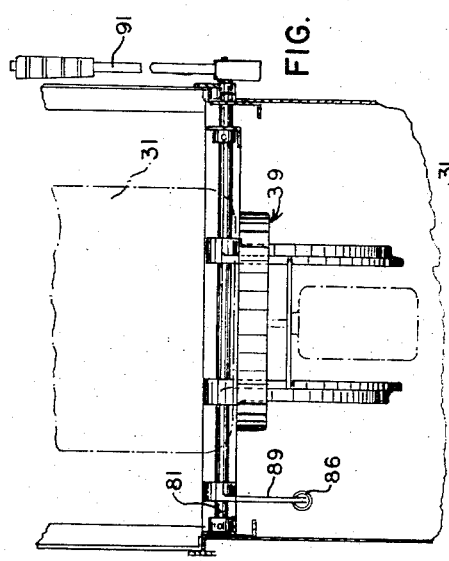
INVENTOR.
DAVID B. EVANS
JOHN C. EVANS
BY *Pearce Schaeperklaus*
Attorneys

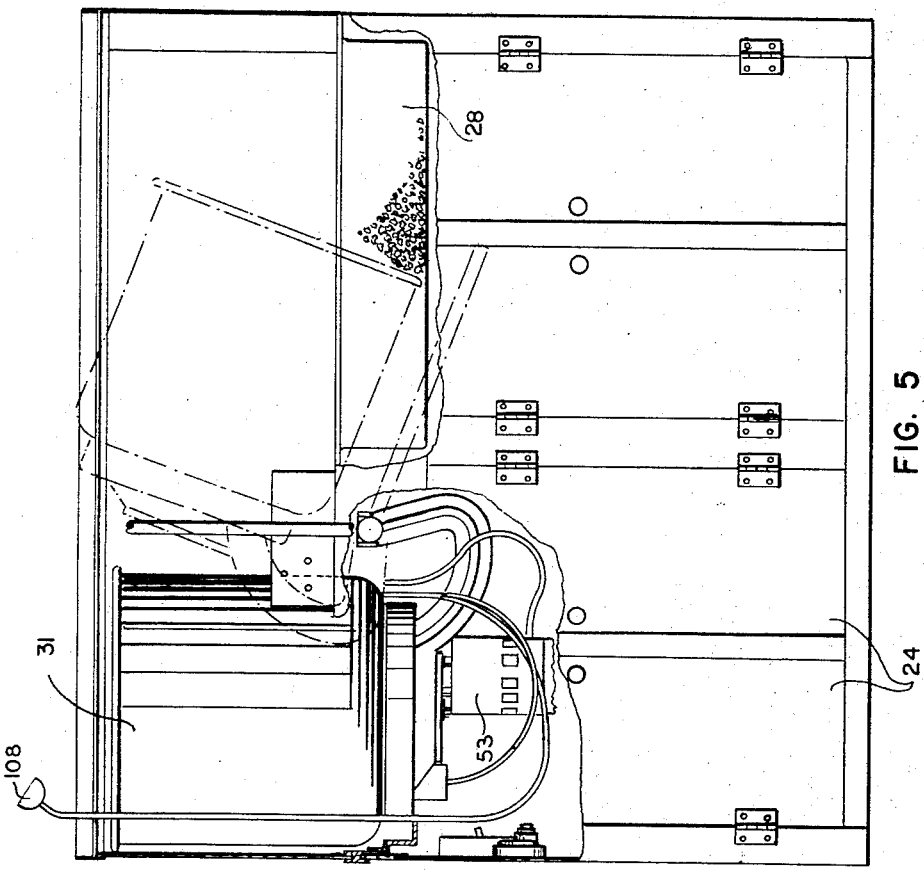
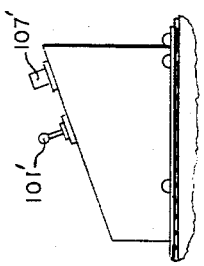
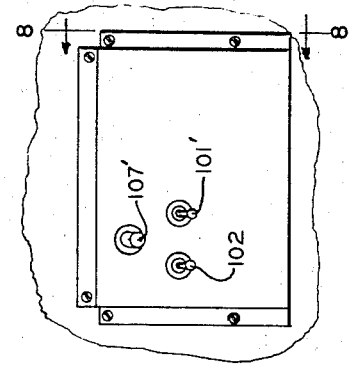
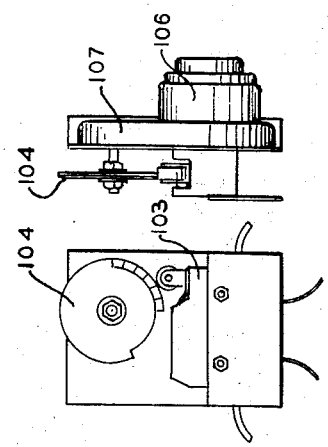

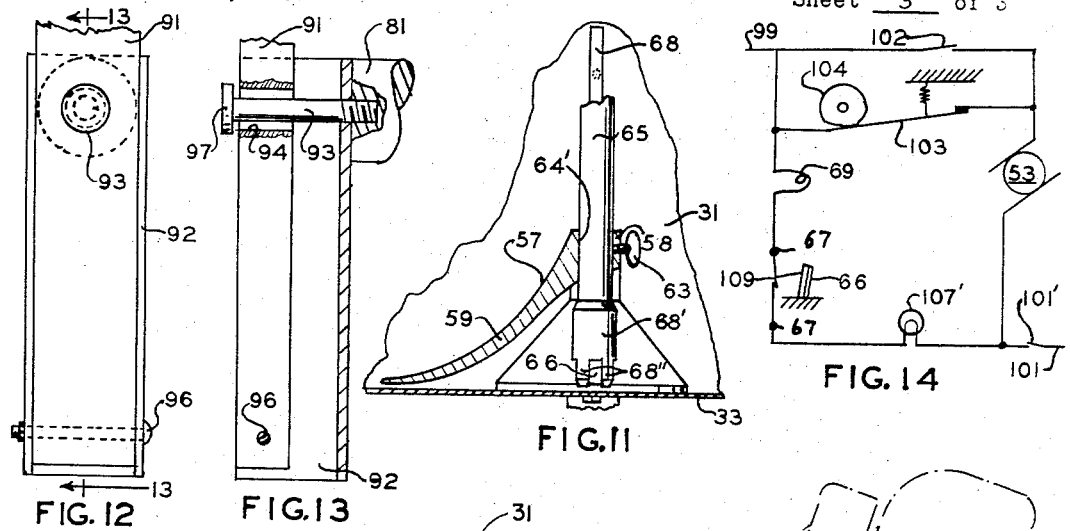
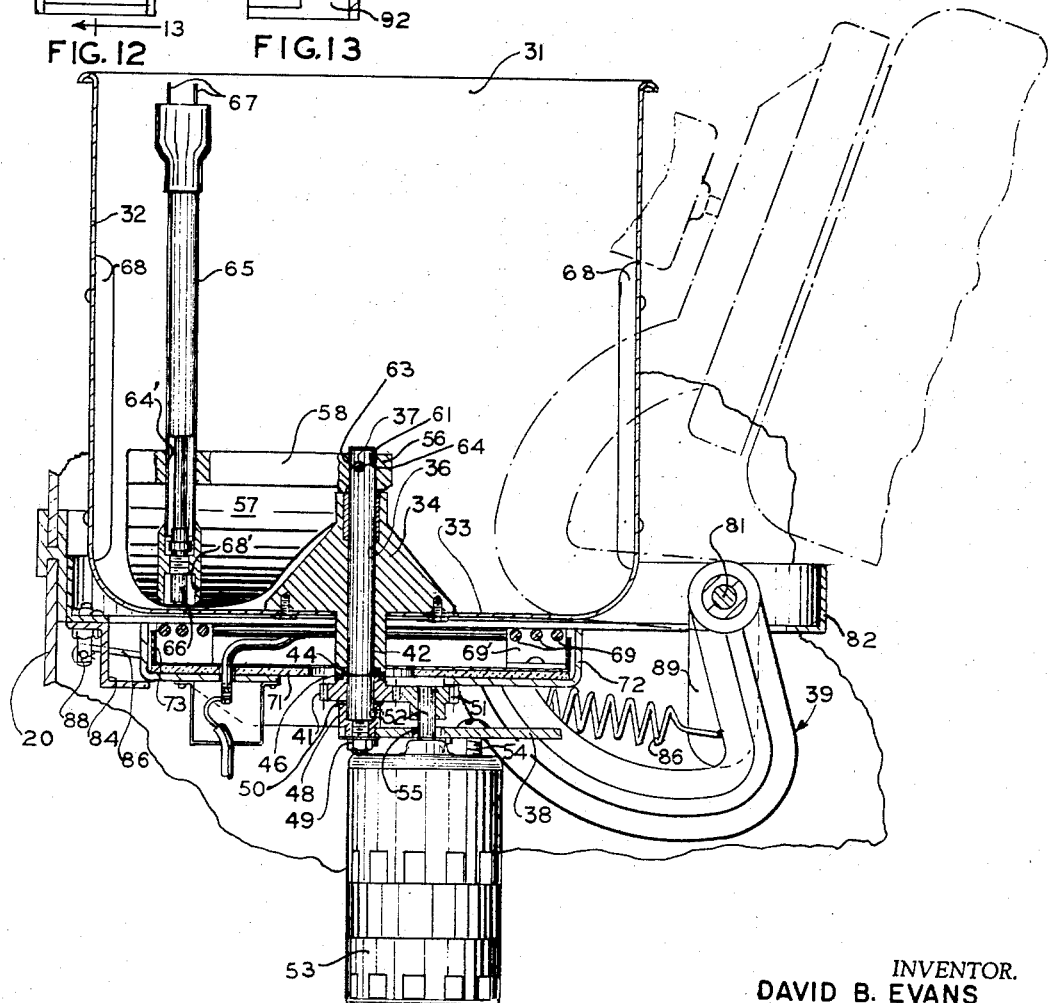

3,421,475
Patented Jan. 14, 1969

3,421,475
MACHINE FOR COATING POPCORN
David B. Evans, Sycamore Township, Hamilton County, and John C. Evans, Columbia Township, Hamilton County, Ohio, assignors to Gold Metal Products Co., Cincinnati, Ohio, a corporation of Ohio
Filed Mar. 9, 1967, Ser. No. 621,929
U.S. Cl. 118—5                                    6 Claims
Int. Cl. B05c 3/08; A23g 3/20

ABSTRACT OF THE DISCLOSURE

A machine for coating popped popcorn which includes a rotatable pot having a heater below the pot and a plow-like agitator in the pot, the axis of the pot being swingable between an upright melt position, an inclined mix position and a second inclined discharge position.

---

This invention relates to a machine for mixing popped popcorn with a caramel coating or the like.

An object of this invention is to provide a machine which melts and mixes the coating material and can also mix the coating material with the popped corn smoothly and uniformly.

Briefly, this invention provides a machine which includes a pot having an upright cylindrical wall and a bottom substantially perpendicular thereto. Means is provided for heating the bottom of the pot. The pot is mounted to rotate about an axis concentric with the upright wall. In addition, the pot is mounted to swing to a position in which the axis inclined while the pot is rotated to mix the popped popcorn with the caramel coating. A plow-like agitator is mounted in the pot adjacent the bottom and stirs the corn to keep it from balling up. The agitator is located in the area where the bottom swings downwardly as the pot rotates, and the corn swings with the pot upwardly and then starts downwardly to the position where the agitator lifts the corn from the bottom to cascade downwardly therefrom. Fins on the wall assist in causing the corn to be raised as the pot turns. When the contents of the pot have been sufficiently mixed, the axis is tipped further until the upright wall slopes downwardly from the bottom, and the contents of the pot can be discharged.

The above and other features and objects of the invention will be apparent to those skilled in the art to which this invention pertains from the following detailed description and the drawings, in which:

FIG. 1 is a plan view of a popcorn coating machine constructed in accordance with an embodiment of this invention;

FIG. 2 is a view in rear elevation of the machine shown in FIG. 1, a part of a front panel thereof being broken away to reveal internal construction;

FIG. 3 is a view in end elevation of the machine shown in FIGS. 1 and 2, a part of a wall thereof being broken away to reveal structural details;

FIG. 4 is a fragmentary view in transverse section of the machine on an enlarged scale, the pot and a drive motor therefor being shown in dot-dash lines;

FIG. 5 is a somewhat schematic view in rear elevation of the machine on an enlarged scale, parts being broken away to reveal structural details, a discharge position of a pot thereof being shown in dot-dash lines;

FIG. 6 is a view in section taken generally on the line 6—6 in FIG. 1 on an enlarged scale;

FIG. 7 is a plan view of a control box of the machine on an enlarged scale;

FIG. 8 is a view in section taken on the line 8—8 in FIG. 7;

FIG. 9 is a view in side elevation of a timing device which forms a part of the machine;

FIG. 10 is a view in rear elevation of the timining device shown in FIG. 9;

FIG. 11 is a view in section taken generally on the line 11—11 in FIG. 1 on an enlarged scale;

FIG. 12 is a fragmentary view in rear elevation of the lower portion and mounting of an operating handle of the machine;

FIG. 13 is a view in section on the line 13—13 in FIGS. 12; and

FIG. 14 is a simplified schematic circuit diagram of control circuits of the machine.

In FIGS. 1–3 inclusive is shown a popcorn coating machine constructed in accordance with an embodiment of this invention including a case 20 having end walls 21, a front wall 22, and a rear wall 23, there being access doors 24 in the rear wall. Upper portions of the walls include transparent panels 25 and 26 mounted in appropriate frame elements 27. An upwardly opening dish-shaped pan 28 is mounted in one end portion of the case 20, as shown in FIGS. 1 and 5. A pot 31 is mounted in the opposite end portion of the case 20.

The pot 31, as shown in FIG. 6, includes an upright hollow cylindrical wall 32 and a flat bottom 33 substantially perpendicular thereto. A central cone 34 is attached to the bottom centrally thereof. The cone has a central bore 36 concentric with the wall 32 in which an upright shaft 37 is received with the central cone and the pot being rotatably mounted on the shaft 37. The shaft 37 in turn is attached to a plate 38 which forms a portion of a swinging framework indicated generally at 39. A spur gear 41 is attached to a neck portion 42 of the central cone 34. A collar 44 of the spur gear 41 is received inside an annular slot in the neck portion 42. A set screw 46 holds the gear 41 and the neck portion 42 in assembled relation. The lower end portion of the upright shaft 37 is received inside a collar 48, which is welded to the plate 38. A nut 49 threaded on the lower portion of the upright shaft 37 holds the shaft in position on the plate 38. A thrust bearing 50 mounted on the shaft 37 overlying the collar 48 rotatably supports the spur gear 41, the cone 34 and the pot 31. The spur gear 41 meshes with a spur gear 51 mounted on a motor shaft 52. The shaft 52 is driven by a motor 53, which is attached to the plate 38 by fasteners 54. The motor shaft 52 extends through an opening 55 in the plate 38.

At the upper end of the shaft 37 is mounted a generally plow-shaped agitator blade 57 which includes a radially extending bar portion 58 and a blade portion 59 which extends downwardly therefrom to adjacent the bottom 33 of the pot 31 as shown in FIG. 11. The pot turns in the direction of the arrow 60 in FIG. 1, and the blade portion 59 is concave toward the direction from which the pot turns. The bar portion is provided with an upright bore 61 (FIG. 6) in which the shaft 37 is received. A thumb screw 63 which extends transversely of the bar portion and is received in a socket 64 in the shaft 37 supports the agitator blade 57. At the outer end of the bar portion 58 an upright bore 64' receives an upright hollow housing 65.

At the lower end of the housing 65 is mounted a thermostat bulb 66 which is adjacent the bottom 33 of the pot 31. Leads (not shown) from the thermostat bulb 66 extend upwardly to connector prongs 67 at the upper end of the housing 59. Agitator fins 68 are attached to and extend inwardly from the side walls 32 of the pot. A shroud 68' is mounted on the lower end of the housing and downwardly extending spaced fins 68" at the lower end of the shroud 68' protect the thermostat bulb. The contents of the pot 31 are heated by electric heater coils 69 which underlie the bottom 33 of the pot 31. The heater coils are supported by slotted angle members 69' which extend upwardly from an asbestos insulator plate 71. The plate 71, in turn, is mounted in a cup-shaped housing 72 mounted on the swinging framework 39. A cup-shaped reflector plate 73 of aluminum or the like is mounted on the insulator plate 71 underlying the heater coils 69.

The swinging framework 39 swings with a cross shaft 81. The cross shaft 81 is pivotally mounted in a stationary main frame 82, which is of generally angle shape in cross section. The stationary frame 82 is supported by walls of case 20. A stop frame 84 of generally Z-shape in section, underlies an edge of the housing 72 to support the swinging framework 39 and the pot 31 in an upright position shown in FIG. 6 in full lines. A tension spring 86 counterbalances a portion of the weight of the pot 31 and the motor 53 and urges the swinging framework toward the dot-dash position of FIG. 6. The spring 86 extends between a lug 88 attached to the stationary frame 82 and a crank 89, which is attached to the shaft 81. The shaft 81 is turned by a radial handle 91 (FIG. 4) by means of which the shaft 81, the swinging framework 39 and the pot 31 are swung from the full line position of FIG. 6 to the dot-dash line position of FIG. 2 which is a mixing position and to the discharge position shown in dot-dash lines in FIGS. 5 and 6. When the swinging framework and the pot are at the mixing position, the handle 91 engages a stop bracket 91' which supports the swinging framework and the pot at the mixing position. The handle 91 is pivotally mounted on a channel shaped frame 92 (FIGS. 12 and 13). The frame 92, in turn, is attached to a rear end of the shaft 81. A stud 93, mounted in the shaft 81 extends outwardly therefrom and through an opening 94 in the handle 91. The handle can swing about a pivot pin 96 mounted in flanges of the frame 92 and also swings with the frame 92 and the shaft 81 as the shaft turns. A head 97 on the stud limits rearward swinging of the handle 91.

In the operation of the popcorn coating machine, coating material, which can include sugar, butter oil and flavoring or the like, is first loaded into the pot 31 with the pot in the upright (full-line) position of FIG. 6 and the heater coils 69 are heated to melt the coating material. During melting of the coating material, the pot is turned intermittently. The power connections to the motor 53 are shown in FIG. 14. Power for operating the motor 53 is supplied by power leads 99 and 101 through a line switch 101' and switches 102 and 103. When the coating material is being heated and melted, power is supplied to the motor 53 through the switch 103. The switch 103 is operated by a cam 104. The cam 104 is rotated by a cam motor 106 (FIG. 10). The cam motor drives reduction gearing (not shown in detail) inside a gear housing 107 which in turn drives the cam 104. The cam motor and the cam 104 are rotated at a constant speed during the melting step and the cam 104 (FIG. 9) intermittently opens and closes the switch 103 so that the motor 53 rotates the pot 31 for a period, then is stationary for a period and then repeats the cycle. In practice, the motor can be operated for a period of 10 seconds during the operating portion of the cycle and can be stationary for 50 seconds. A time of ten to twelve minutes can be sufficient to bring the coating mixture to a temperature of 275° F. which is sufficient for the coating step. A warning light 107' is illuminated when the coils 69 are being heated.

The thermostat bulb 66 is disposed in the coating material during the melting step. During the melting, an electric connector plug 108 is connected to the prongs 67 to connect the thermostat operated switch 109 (FIG. 14) in series with the heater coils 69. When the temperature of the coating mixture reaches 275° F., the thermostat operated switch 109 opens the circuit to the heating coils 69, and heating of the contents of the pot stops. Then, the plug 108 is disconnected from the thermostat housing prongs 67, popped popcorn is loaded into the pot, the pot is swung to the mixing position (dot-dash line position of FIG. 2), and the motor switch 102 is closed to cause the motor to rotate. As the pot rotates, the melted but viscous coating material rotates with the pot at and near the bottom thereof. The popped popcorn also rotates with the pot, being urged therewith by the fins 68. The corn follows the bottom of the pot until it reaches the agitator blade 57 and then is caused to cascade away from the bottom as the pot turns to fall again toward the lowermost part of the wall 32 of the pot 31. When the coating material has been thoroughly mixed with the popped popcorn, the motor switch 102 is opened to stop the motor, and the pot is swung to the discharge position (dot-dash line position of FIGS. 5 and 6). The coated popcorn is then discharged into the pan 28 and is collected therein.

The popcorn coating machine illustrated in the drawings and described above is subject to structural modification without departing from the spirit and scope of the appended claims.

Having described our invention, what we claim as new and desire to secure by Letter Patent, is:

1. A machine for coating popcorn which comprises a pot having a substantially flat bottom and an upstanding cylindrical wall, means for rotating the pot about an axis concentric with the wall, means for swinging the axis of the pot between an upright melt position, an inclined mixing position at which the axis slopes upwardly from the bottom, and an inclined discharge position at which the axis slopes downwardly from the bottom, means for heating the bottom of the pot when in the melt position to melt coating material in the pot, and a plow shaped agitator mounted in the pot in position to engage popcorn in the pot when in mixing position to raise the popcorn from the bottom to cascade toward the lower portion of the bottom and of the wall to agitate the popcorn as the popcorn is being coated.

2. A machine as in claim 1 wherein the agitator is mounted at a position adjacent the portion of the bottom which is descending as the pot turns at mixing position, and the agitator is concave toward the direction from which the popcorn descends.

3. A machine as in claim 1 wherein a thermostat housing is mounted in the agitator, a thermostat is supported by the thermostat housing adjacent the bottom and at a position behind the agitator to register the temperature of coating material when the pot is in melt position and the thermostat is connected to control the heating means to shut off the heating means when the thermostat registers a predetermined temperature.

4. A machine as in claim 1 wherein a cone fitting is mounted in the pot centrally thereof, the cone fitting having an upwardly and inwardly extending wall adjacent the agitator urging the popcorn outwardly and into engagement with the agitator as the pot turns in mixing position.

5. A machine for coating popcorn which comprises a pot having a bottom and an upstanding cylindrical wall, means for rotating the pot about an axis concentric with the wall, means for swinging the axis of the pot between an upright melt position, an inclined mixing position at which the axis slopes upwardly from the bottom, and an inclined discharge position at which the axis slopes downwardly from the bottom, and a plow shape agitator mounted in the pot in position to engage popcorn in the pot when in mixing position ot raise the popcorn from the bottom to cascade toward the lower portion of the bottom and of the wall to agitate the popcorn as the popcorn is being coated.

6. A machine as in claim 5 wherein the agitator is mounted at a position adjacent the portion of the bottom which is descending as the pot turns when in said mixing position, the agitator is concave toward the direction from which the popcorn descends, and a cone fitting is mounted in the pot centrally thereof, the cone fitting having an upwardly and inwardly extending wall adjacent the agitator and urging the popcorn outwardly and into engagement with the agitator as the pot turns when in mixing position.

References Cited

UNITED STATES PATENTS

| | | | |
|---|---|---|---|
| 1,112,213 | 9/1914 | Hult et al. | 259—34 |
| 1,302,923 | 5/1919 | Hills | 259—88 |
| 2,092,282 | 9/1937 | Love | 259—88 X |
| 3,095,326 | 6/1963 | Green et al. | 118—19 X |

OTHER REFERENCES

German printed application 1,183,626, printed December 1964, 3 pp. spec., 1 sht. drwg. class 118, subclass 19.

WALTER A. SCHEEL, *Primary Examiner.*

JOHN P. McINTOSH, *Assistant Examiner.*

U.S. Cl. X.R.

118—19